United States Patent [19]
Colombo et al.

[11] Patent Number: 5,678,234
[45] Date of Patent: Oct. 14, 1997

[54] PROCESS FOR THE ENCAPSULATION AND STABILIZATION OF RADIOACTIVE, HAZARDOUS AND MIXED WASTES

[75] Inventors: Peter Colombo, Patchogue; Paul D. Kalb, Wading River; John H. Heiser, III, Bayport, all of N.Y.

[73] Assignee: Associated Universities, Inc., Washington, D.C.

[21] Appl. No.: 334,930

[22] Filed: Nov. 7, 1994

Related U.S. Application Data

[63] Continuation-in-part of Ser. No. 994,527, Dec. 21, 1992, abandoned, which is a continuation-in-part of Ser. No. 699,323, May 13, 1991, abandoned.

[51] Int. Cl.$^6$ .................................................. G21F 9/00
[52] U.S. Cl. ..................... 588/4; 588/252; 588/256; 106/815
[58] Field of Search ................................ 588/3, 4, 252, 588/256; 106/705, 710, 815, 287.32; 528/389

[56] References Cited

U.S. PATENT DOCUMENTS

| | | | |
|---|---|---|---|
| 3,152,984 | 10/1964 | Winsche et al. | 252/631 |
| 3,997,355 | 12/1976 | Santucci et al. | 106/275 |
| 4,134,775 | 1/1979 | Schwoegler | 106/286.8 |
| 4,269,728 | 5/1981 | Schweitzer et al. | 252/626 |
| 4,290,816 | 9/1981 | Ludwig et al. | 106/287.32 |
| 4,311,826 | 1/1982 | McBee et al. | 528/389 |
| 4,348,313 | 9/1982 | McBee et al. | 524/788 |
| 4,414,385 | 11/1983 | Swanson | 524/494 |
| 4,428,700 | 1/1984 | Lennemann | 405/128 |
| 4,496,659 | 1/1985 | Nimer et al. | 501/140 |
| 4,500,449 | 2/1985 | Kuhnke et al. | 252/628 |
| 4,594,186 | 6/1986 | Kunze et al. | 252/628 |
| 4,601,832 | 7/1986 | Hooykaas | 210/717 |
| 4,620,947 | 11/1986 | Carlson | 252/628 |
| 4,629,509 | 12/1986 | O'Hara et al. | 106/118 |
| 4,844,815 | 7/1989 | Ader et al. | 210/751 |
| 5,037,286 | 8/1991 | Roberts | 425/222 |
| 5,049,285 | 9/1991 | Somerville et al. | 210/710 |

OTHER PUBLICATIONS

Oak Ridge National Laboratory, "spent Fuel and Radioactive Inventories and Projections", DOE/NE-0017/2, ORNL Oak Ridge, TN (Sep. 1983).
"Second Progress Report for the WERF Incinerator", EGG-WM-8154, Idaho National Engineering Laboratory, EG&G Idaho, Inc. Idaho Falls Idaho (Jun. 1988).
Kalb and Colombo, "Modified Sulfur Cement Solidification of Low-Level Wastes, Topical Report", BNL 51923, Brookhaven National Laboratory, Upton, NY (Oct. 1985).
Shelton, "Supply and Demand for Sulphur in the United States", Sulphur '81, Calgary, alberta Canada (May 25-28, 1981).
"SCRETE Sulfur Concrete", Manufacturer's Data Sheet, Chevron Chemical, Co., San Francisco, CA.
Sullivan, et al., "Development and Testing of Superior Sulfur Concretes", RI-8160, Bureraru of Mines, U.S. Department of the Interior, Washington, D.C. (1976).
Meyer, Sulfur, Energy and Environment, Elsevier Scientific Publishing Co., New York (1977).
Neilson and Colombo, "Properties of Radioactive Wastes and Waste Containers, First Topical Report", BNL NUREG-50957, Brookhaven National Laboratory, Upton, NY (Jan. 1979).
Neilson, Kalb, Fuhrmann and Colombo, "solidification of Ion Exchange Resin Waste in Hydraulic Cement", The Treatment and Handling of Radioactive Wastes, Blasewitz, et al. (eds.) springer-Verlag, NY (1983).
Jong et al., "Fiber Reinforcement of Concrete to Enhance Flexural Properties", RI-8956, Bureau of Mines, Department of Interior, Washington, DC (1985).
"Material Safety Data Sheet, CHEMENT™ 2000", Martin Chemical Inc. Houston, Texas (undated).
Van Dalen, Et al., "Modified Sulfur Cement as a Matrix for Non-Heat Generating Nuclear Wastes", Proceedings of an International Symposium on Management of Low and Intermediate Level Radioactive Waste Jointly Organized by the International Atomic Energy Society and the Commission of the European Communities and held in Stockholm, 16-20 May 1988, 2, 219-221 International Atomic Energy Agency, Vienna (1989).
Kalb, P. D. et al., "Encapsulation of Mixed Radioactive and Hazardous Waste Contaminated Incinerator Ash in Modified Sulfur Cement," BNL Report No. 43691, 1990.

*Primary Examiner*—Ngoclan Mai
*Attorney, Agent, or Firm*—M. C. Bogosian

[57] ABSTRACT

The present invention provides a method for encapsulating and stabilizing radioactive, hazardous and mixed wastes in a modified sulfur cement composition. The waste may be incinerator fly ash or bottom ash including radioactive contaminants, toxic metal salts and other wastes commonly found in refuse. The process may use glass fibers mixed into the composition to improve the tensile strength and a low concentration of anhydrous sodium sulfide to reduce toxic metal solubility. The present invention preferably includes a method for encapsulating radioactive, hazardous and mixed wastes by combining substantially anhydrous wastes, molten modified sulfur cement, preferably glass fibers, as well as anhydrous sodium sulfide or calcium hydroxide or sodium hydroxide in a heated double-planetary orbital mixer. The modified sulfur cement is preheated to about 135°±5° C., then the remaining substantially dry components are added and mixed to homogeneity. The homogeneous molten mixture is poured or extruded into a suitable mold. The mold is allowed to cool, while the mixture hardens, thereby immobilizing and encapsulating the contaminants present in the ash.

14 Claims, 7 Drawing Sheets

PROCESS FOR THE ENCAPSULATION AND STABILIZATION OF RADIOACTIVE, HAZARDOUS AND MIXED WASTES

CROSS REFERENCE TO RELATED APPLICATIONS

The instant application is a continuation-in-part of application Ser. No. 994,527 filed Dec. 21, 1992, now abandoned, which in turn is a continuation-in-part of application Ser. No. 699,323 filed May 13, 1991, and now abandoned.

BACKGROUND OF THE INVENTION

This invention was made with Government support under contract number DE-AC02-76CH00016, between the U.S. Department of Energy and Associated Universities, Inc. The Government has certain rights in the invention.

1. Field of the Invention

This invention relates to a method for encapsulation and stabilization of radioactive, hazardous and mixed waste in modified sulfur cement.

2. Background of the Related Art

Large volumes of low-level radioactive wastes are routinely generated through the operation of defense-related and commercial nuclear facilities. In 1982, for example, the Department of Energy and defense related activities produced some $89.1 \times 10^3$ cubic meters of low-level radioactive waste (LLW), whereas, the commercial sector generated $75.9 \times 10^3$ cubic meters; see, Oak Ridge National Laboratory, "Spent Fuel and Radioactive Inventories and Projections", DOE/NE-0017/2, ORNL, Oak Ridge, Tenn. (September 1983). These numbers have steadily increased through the 1980's to date. Hazardous and mixed wastes at DOE facilities include a broad range of waste types, such as evaporator concentrate, salts, sludges, filter materials, ion exchange resins, incinerator bottom ash and fly ash encompassing diverse physical and chemical properties. Many of these wastes have been identified as "problem" wastes because they are difficult to encapsulate using conventional technologies, and/or produce waste forms of poor quality that do not successfully retain their hazardous constituents in the disposal environment. The difficulties associated with these "problem" wastes are usually related to the chemical and physical properties of wastes and their interactions with the binder materials. Accordingly, it has been an objective of this invention to develop materials and processes that:

I. Have the potential to encapsulate the "problem" mixed wastes where current practices are inadequate;

II. Minimize the potential for release of toxic materials to the environment;

III. Result in durable waste forms that can withstand anticipated conditions during storage, transportation and disposal; and IV. Are simple to operate, easy to maintain and are economical.

Due to the large reduction in volume resulting from incineration of contaminated combustible materials, remaining ash residues, such as fly ash and incinerator bottom ash, may contain sufficient quantities of hazardous elements including heavy metals that they meet Environmental Protection Agency ("EPA") criteria for Resource Conservation and Recovery Act (RCRA) characteristic hazardous wastes definition, as well as DOE definitions for low-level radioactive waste. These "mixed wastes" must first be treated to immobilize hazardous constituents according to EPA's guidelines for delisting of hazardous wastes before disposal at approved LLW disposal sites. One of the DOE mixed waste streams under consideration in the present invention, investigated by the inventors at the Brookhaven National Laboratories (BNL), is incinerator fly ash generated at the Waste Experimental Reduction Facility (WERF) at the Idaho National Engineering Laboratory (INEL). Additional formulation work was conducted using bottom ash from a rotary kiln incinerator at the Rocky Flats Plant (RFP).

The WERF incinerator is a dual chamber, controlled air design. Currently the WERF incinerator is operating at about 2000 hours per year, the average annual throughput is 60,000 ft³ of solid combustible waste, resulting in a volume reduction ratio on the order of 300:1. Waste is fed dynamically into the incinerator at an average rate of about 181 kg/hr (400 lbs/hr). The incinerator is generally operated in cycles of a feed/initial burn for 4 hours followed by a final burn for 4 hours. The flue gas cleanup and fly ash collection system includes a bag house and high-efficiency particulate HEPA filtration. A typical feed for the WERF incinerator contains 50 wt% rags and papers, 35 wt % polyethylene, 10 wt % wood, and 5 wt % rubber; see, Dalton, "Second Progress Report for the WERF Incinerator", EGG-WM-8154, Idaho National Engineering Laboratory, EG & G Idaho, Inc., Idaho Falls, Idaho (June 1988). The INEL fly ash contains a total of about 1.5 Bq/g (40 pCi/g) of activity which includes mixed fission products (primarily Cs-137) and activation products (primarily Co-57 and Sb-125). Elemental analysis of the ash was performed for 12 elements by acid digest and flame emission atomic absorption (AA) spectrophotometry. Results of these analysis expressed as wt % of ash are summarized in Table 1. Hazardous constituents include significant concentrations of 2 of the 8 metals (i.e., Pb and Cd) identified by EPA as toxic metals in the recently published final rule on the Identification and Listing of Hazardous Waste, 40 CFR 261, Environmental Protection Agency (EPA), 55 FR 11862 (March 1990). Encapsulation and disposal of this ash is further complicated by the presence of highly soluble metal chloride salts, primarily zinc chloride that create an acidic environment in the presence of moisture. The pH of the ash slurry is about 3.8. Thus the zinc chloride in the presence of moisture can create a condition that interferes with the hydration reaction of conventional encapsulation materials, such as concretes, and greatly increase mobility of contaminants. Solid phase analysis of the ash was performed using a scanning electron microscope (SEM) and energy dispersive x-ray spectrophotometry. FIG. 1 is a SEM photograph and the associated x-ray spectrum of INEL fly ash magnified 15,000 times, depicting a typical zinc chloride crystal.

TABLE 1

| Elemental composition of INEL Incinerator Fly Ash | |
|---|---|
| Element | Weight Percentage |
| Zinc | 36.0 |
| Lead | 7.5 |
| Sodium | 5.5 |
| Potassium | 2.8 |
| Calcium | 0.8 |
| Copper | 0.7 |
| Iron | 0.5 |
| Cadmium | 0.2 |
| Chromium | BDL[a] |
| Barium | BDL |
| Silver | BDL |
| Nickel | BDL |

[a]Below detection limits (<0.05 wt %)

Incinerator ash generated at the Rockwell International Rocky Flats Plant rotary kiln incinerator (RFP incinerator ash) was employed as another typical volume reduction ash product. This ash was produced by burning simulated waste, with constituents equivalent to those present in actual combustible LLW from this facility, including about 40 wt % paper, 22.8 wt % polyethylene, 18.8 wt % neoprene, 9.5 wt % kerosene, 7.9 wt % polyvinyl chloride and 1.0% tributyl phosphate. As received, the ash had a bulk density of approximately 0.23 g/cm$^3$. The particle size of the ash was non-uniform, accordingly the ash was put through a No. 8 sieve, resulting in a maximum particle size of 2.38 mm to improve waste homogeneity; see, Kalb and Colombo, "Modified Sulfur Cement Solidification of Low-Level Wastes, Topical Report", BNL-51923, p. 13, Brookhaven National Laboratory, Upton, N.Y. (October 1985).

The investigation of modified sulfur cement as a potential radioactive waste solidification agent was performed at Brookhaven National Laboratory as part of the Waste Form Evaluation Program, sponsored by the United States Department of Energy Low-Level Waste Management Program. A detailed report of this investigation was prepared by two of the inventors herein, Kalb and Colombo, "Modified Sulfur Cement Solidification of Low-Level Wastes, Topical Report", BNL 51923, Brookhaven National Laboratories, Upton, N.Y. (October 1985). A primary objective of the Waste Form Evaluation program was the application of materials and processes which were not employed at that time in the United States for improved solidification of low-level radioactive wastes (LLW).

Modified Sulfur Cement

Modified sulfur cement is related to traditional hydraulic cements, e.g. portland cement, in name only. In contrast to hydraulic cement and other contemporary LLW binders such as thermosetting polymers, a chemically induced curing reaction is not required to solidify modified sulfur cement. As a thermoplastic material, modified sulfur cement can be heated above the melt temperature, combined with waste to form a homogeneous mixture and allowed to cool forming a solid monolithic product. By eliminating solidification chemistry, processing is simplified and waste form quality is less subject to variation due to slight changes in waste stream composition.

Interest in sulfur cement as an alternative to hydraulic cements dates back to the early 20th century. Its corrosion resistant properties made it a candidate for potential use as a construction material in the chemical industry; see Raymont, "Sulphur Concrete and Coatings", New Uses for Sulphur Technology of Canada (SUDIC), Calgary, Alberta, Canada (1978). Product failures were encountered during the use of these early formulations, which have been attributed to internal stresses set up by changes in the crystalline structure upon cooling. Attempts to improve product durability by the addition of modifying agents were either unsuccessful or uneconomical. Since the early 1980's, mandated pollution abatement programs which require sulfur dioxide removal from combustion stack gases have resulted in increased projections of the involuntary supply or sulfur. Sulfur is also a by-product recovered from the refining of natural gas and petroleum. By the year 2000, it is estimated that as much as 85–90% of all sulfur production will result from these clean-up operations, possibly yielding over 2.5× 10$^7$ tons per year; see Shelton, J. E., "Supply and Demand for Sulphur in the United States", Sulfur'81, Calgary, Alberta, Canada, May 25–28, 1981. In an attempt to develop new, commercially viable uses for this by-product material, in 1972 the U.S. Bureau of Mines (USBM) initiated a Sulfur Utilization Program. Modified sulfur cement was developed employing readily available and relatively inexpensive chemical modifiers which significantly improve product durability. Modified sulfur cement is now commercially available under license from the U.S. Department of the Interior.

Compared with hydraulic portland cements, sulfur cement has a number of advantages. The compressive and tensile strengths of sulfur cements are twice those of comparable portland concretes. Full strength is reached in a matter of hours rather than several weeks. Concretes prepared using sulfur cements are extremely resistant to most acids and salts. Sulfates, for example, which are known to attack hydraulic cements have little or no effect on the integrity of sulfur cement; see, "SCRETE Sulfur Concrete", Manufacturer's Data Sheet, Chevron Chemical Co., San Francisco, Calif. Because of these properties, modified sulfur cement has been proposed for use as a paving material, and for the production of tanks, pipes and other structures where durable concretes are required.

Initial USBM attempts to develop modified sulfur cement involved the reaction of elemental sulfur with unsaturated hydrocarbon dicyclopentadiene (DCPD). This material is commercially available at relatively low cost (approximately $0.08–0.12 per pound, 1976) as reported by Sullivan et al., "Development and Testing of Superior Sulfur Concretes", RI-8160, Bureau of Mines, U.S. Department of the Interior, Washington, D.C. (1976). Although product durability was enhanced by the addition of DCPD, processing difficulties were encountered due to an unstable exothermic reaction which, if uncontrolled resulted in extremely viscous mixtures. This isotherm results from the rapid depolymerization of DCPD to the monomeric form, cyclopentadiene (CPD) at the reaction temperatures of 120°–140° C. that are necessary for sulfur polymerization, as shown in Reaction 1:

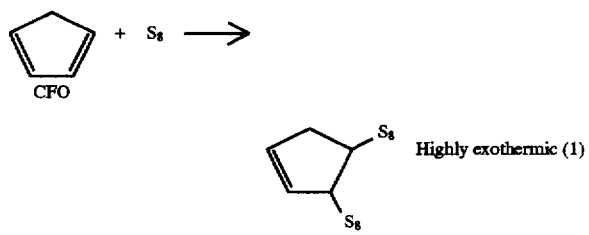

Remaining DCPD then reacts with the polysulfide product formed in Reaction 1, as shown in Reaction 2:

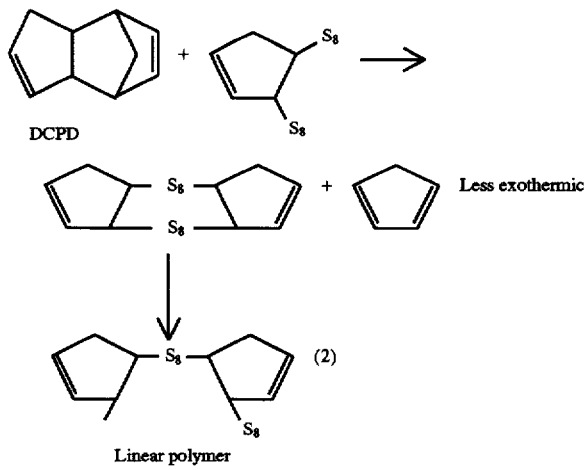

USBM researchers found that a mix modifier system which includes DCPD and an oligomer of CPD resulted in a lower isotherm, and thus, a more readily controlled reaction. The oligomer product is derived from the commercial production of DCPD resin and contains approximately 10% dimer an trimer, 20% tetramer, 45% pentamer and 10% higher polymers. The reaction between oligomer and polysulfide product of Reaction 1 is more stable and the oligomer breaks down slowly to from DCPD, as shown in Reaction 3:

The modified sulfur cement suitable for the present invention is manufactured by Martin Resources, Inc., Odessa, Tex. and is marketed under the tradename CHEMENT 2000.

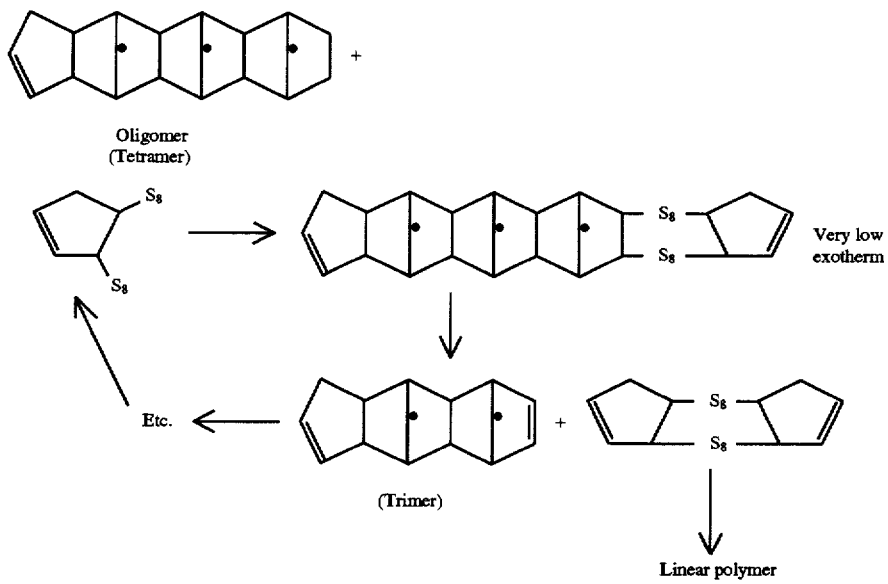

Further research was conducted by the USBM to determine the effects of varying the percentages of total modifier added, the relative proportions of modifier constituents, i.e. DCPD and CPD oligomer, and reaction methodologies. From the point of view of developing a useful construction material, the USBM selected a formulation containing 5 wt % modifiers including equal parts of DCPD and an oligomer of CPD. This formulation yields a product of low viscosity upon melting, an advantage for mixability and handling considerations. Varying compositional parameters resulted in modified sulfur cements with a wide range of properties. Formulations developed with an increased proportion of modifiers (from 10–40 wt %) and varying ratios of DCPD/CPD oligomer produced higher viscosity end products which were more elastic in nature than those containing 5 wt % modifiers.

The USBM determined that the thermally most stable formulation is that of the 5 percent mixture of equal parts DCPD and CPD oligomer which yields a flat thermal stability profile with a final viscosity of 28 cp at 135° C. after over 30 hours reaction time. In contrast, a formulation containing only DCPD is quite unstable with a sharply increasing viscosity measured at >450 cp at 135° C. after 12 hours reaction time.

The effects of various formulations on the structural behavior of modified sulfur cement was tested with elemental sulfur utilizing differential scanning calorimeter (DSC) thermograms. These tests indicate the quantity of thermal energy absorbed as the sample specimen is heated at a controlled rate. For the elemental sulfur and the DCPD modified sulfur, a peak representing the solid phase tansformation from orthorhombic ($\alpha$) to monoclinic ($\beta$) forms was detected at 104° C., as well as a peak at approximately 119° C. representing the solid-liquid phase transformation. The formulations containing mixtures of DCPD and oligomer resulted in thermograms which indicated that the solid phase transformation had successfully been eliminated.

Martin Resources, Inc. produces the USBM formulation of 5 wt % modifier concentration with DCPD/CPD oligomer ratio=1.0.

Dual steam heated reactor vessels with a combined capacity of 18 tons of molten sulfur are used for the processing of CHEMENT 2000. Molten elemental sulfur is reacted with the modifier mixture at 140°±5° C. under constant stirring for a total of four hours. The material is then fed to a water cooled belt where it solidifies, chopped into ⅛ inch thick diameter particles and packed in 50 pound bags for shipment.

Since the production of modified sulfur cement is accomplished by batch processing, the end-product properties may vary slightly from batch to batch. This phenomenon was detected in a DSC thermogram performed at BNL on a sample of CHEMENT 2000. The thermogram detected a minor peak at 140° C., which can presumably be attributed to either a small percentage of unreacted elemental sulfur present in the batch, or the slow transformation of some of the sulfur from a monoclinic to an orthorhombic structure over time. Since USBM testing has shown no significant change in modified sulfur cement structure at intervals of 14 and 21 months, the minor $\alpha$ peak was most likely due to traces of unreacted sulfur.

The 1985 report is primarily directed towards describing in detail the testing of various low-level radioactive wastes solidified in modified sulfur cement. The report describes experiments on four types of waste encapsulated in modified sulfur cement.

1. Sodium sulfate ($NaSO_4$) evaporator concentrate salts.
2. Boric acid evaporator concentrate salts.
3. Incinerator bottom ash.
4. Ion exchange resins.

In order to simulate sodium sulfate evaporator concentrate salts, anhydrous sodium sulfate ($NaSO_4$) was tested. In addition, incinerator ash was tested, and in some experiments radioactive Cobalt ($^{60}Co$) and Cesium ($^{137}Cs$) tracers were added. The 1985 report recommends the combination containing modified sulfur cement with up to 43% by weight incinerator ash. The 1985 report also recommends the combination of up to 40% by weight anhydrous sodium sulfate (NaSO$_4$) and 60% by weight modified sulfur cement.

Boric acid evaporator salts were encapsulated in modified sulfur cement with satisfactory results at waste loadings up to 40% by weight. Ion exchange resins were also tested in a modified sulfur cement. These, however, cracked on immersion in water, thus exhibiting unsatisfactory performance.

The 1985 report also included an extensive background on the production, modification and use of modified sulfur cement, which has been discussed above, as well as a detailed discussion of various wastes listed above. The entire description contained in the 1985 report is incorporated by reference herein.

The experiments described in the 1985 report utilized a heated screw-type extruder in one embodiment, which continuously processed the modified sulfur cement mixture. Alternatively, a dual-action mixer having a vessel that could be both heated and evacuated was also utilized. Dual-action mixing was accomplished in a stainless-steel vessel having slightly greater than 2 liter capacity, heated by resistance heaters. The dual-action mixer's temperature and mixing time were digitally controlled. The dual-action mixing was accomplished by an impeller blade and teflon wipers. The wiper blades were oriented at 180° on a drilled stainless-steel plate that was supported at its center by a power shaft. A three-blade impeller was affixed to the base of the power shaft to provide vortex mixing action. The mixer was driven by a high torque compressed air motor. For use with both the screw extruder and dual-action mixer, modified sulfur cement was pre-heated to 140°±5° C. and the waste solids were gradually added to allow better mixing and provide high waste loading.

The 1985 topical report does not describe utilizing modified sulfur cement with a combination of substantially anhydrous radioactive, hazardous and mixed wastes and anhydrous sodium sulfide to reduce toxic metal solubility. In addition, the 1985 topical report does not describe using glass fibers to increase the mechanical strength of the hardened composite product. Rather, compositions described in the 1985 report relate to separate combinations of either sodium sulfate (NaSO$_4$) and modified sulfur cement, or incinerator ash in modified sulfur cement.

The precipitation of heavy metals as their sulfides has been used to extract heavy metals from waste waters. For example, in U.S. Pat. No. 4,629,509 issued to O'Hara, et al. the addition of calcium sulfide or dry lime and an aqueous solution of an inorganic salt supplying sulfide is used to extract cadmium and lead from solid residues obtained in the incineration of hazardous waste. By treating the resulting fly ash with dry lime and an aqueous solution of alkali metal sulfide, O'Hara et al. intend to reduce the amount of cadmium and lead which can be leached from the fly ash refuse. In the O'Hara et al. system the cadmium and lead become immobilized as precipitates of cadmium and lead sulfide and must also be disposed of without damaging the environment. The precipitates disclosed in O'Hara, et al. are not encapsulated and, O'Hara et al. does not disclose a method of treating radioactive, hazardous and mixed wastes.

Accordingly, it is a purpose of the present invention to provide a method and composition for encapsulating and stabilizing radioactive, hazardous and mixed wastes in a modified sulfur cement thermoplastic material which has high compressive strength and is resistant to degradation by environmental conditions, including water immersion, acidic conditions, the presence of radioactivity, and heating and cooling during prolonged storage and disposal.

SUMMARY OF THE INVENTION

The and other purposes and objectives are achieved by the present invention which provides a method for encapsulating and stabilizing radioactive, hazardous and mixed wastes in a modified sulfur cement composition. The modified sulfur cement composition further includes incinerator fly ash or bottom ash containing radioactive contaminants and toxic metal salts. The composition preferably includes glass fibers mixed into the composition to improve tensile strength. The preferred composition also includes a low concentration of substantially anhydrous anti-leaching agent such as preferably sodium sulfide (Na$_2$S) to reduce toxic metal solubility. The method of the present invention for encapsulating radioactive, hazardous and mixed wastes and simultaneously preventing leaching of the encapsulated wastes includes combining the substantially anhydrous ash contaminants with molten modified sulfur cement, a substantially anhydrous anti-leaching agent and a strength enhancing agent as a substantially homogenous mixture which is then cast in selected waste forms. Preferably all the components are combined and mixed in a heated double planetary orbital mixer. The anhydrous anti-leaching agent includes calcium hydroxide, sodium hydroxide, sodium sulfide, calcium oxide, or magnesium oxide. Carbon fibers, steel fibers, and glass fibers are useful strength enhancing agents.

It is preferable that the mixing steps are conducted under a partial vacuum, in order to vent entrapped air and residual moisture in the waste. The loading of substantially anhydrous incinerator fly ash can be greater than 16% of the composition while still maintaining more than 4000 psi compressive strength. The casting into a selected waste form includes cooling at a rate which prevents the production of allotropes which revert to a brittle phase after cooling.

A preferred composition of components is approximately 40% by weight incinerator dry fly ash, 52.5% by weight modified sulfur cement, 0.5% by weight of glass fibers and preferably approximately 7% by weight anhydrous sodium sulfide. For radioactive bottom ash without the presence of toxic metals, another preferred composition of components is approximately 43% by weight bottom ash, 56.5% by weight modified sulfur cement, and 0.5% by weight glass fibers.

As a result of the present invention a method for both physical and chemical encapsulation of radioactive, hazardous and mixed waste is provided whereby these wastes are stabilized by the addition of an anti-leaching agent. The combination of dry radioactive, hazardous and mixed wastes and a substantially anhydrous anti-leaching agent with molten modified sulfur cement ensures the physical encapsulation of environmentally undesirable wastes.

The addition of a strength enhancing agent to the molten mixture of modified sulfur cement and radioactive, hazardous and mixed wastes results in the formation of waste forms with enhanced compressive and tensile strength which are highly resistant to degradation by environmental conditions. When the waste forms of the present invention are stored at a disposal facility, water moisture from the environment eventually permeates the modified sulfur cement thereby promoting the formation of insoluble precipitates with the hazardous and toxic materials found in the encapsulated sulfur cement form. The encapsulation of the different types of wastes into modified sulfur cement provide a physical barrier against escape of waste into the environment. The subsequent formation of insoluble precipitates provides an additional chemical barrier against escape of waste into the environment. Moreover, since the waste forms of the present invention can be sequestered at a selected disposal site, the practioner is provided with yet another control mechanism to reduce contamination of the environment.

Furthermore, the process provided by the present invention is economical. By encapsulating the dry wastes with an amount of dry anti-leaching agent, the anti-leaching agent is accessed only as required to prevent leaching once moisture permeates the modified sulfur cement form. This approach allows the use of much smaller quantities of anti-leaching agent than would be required if precipitation were to occur prior to encapsulation in modified sulfur cement.

For a better understanding of the present invention, reference is made to the following description, tables and figures, the scope of which is pointed out in the appended claims.

BRIEF DESCRIPTION OF THE DRAWINGS

FIG. 6 shows photographs of modified sulfur cement waste form specimens containing INEL incinerator fly ash following 90 day water immersion test.

DETAILED DESCRIPTION OF THE INVENTION

Figure 1:
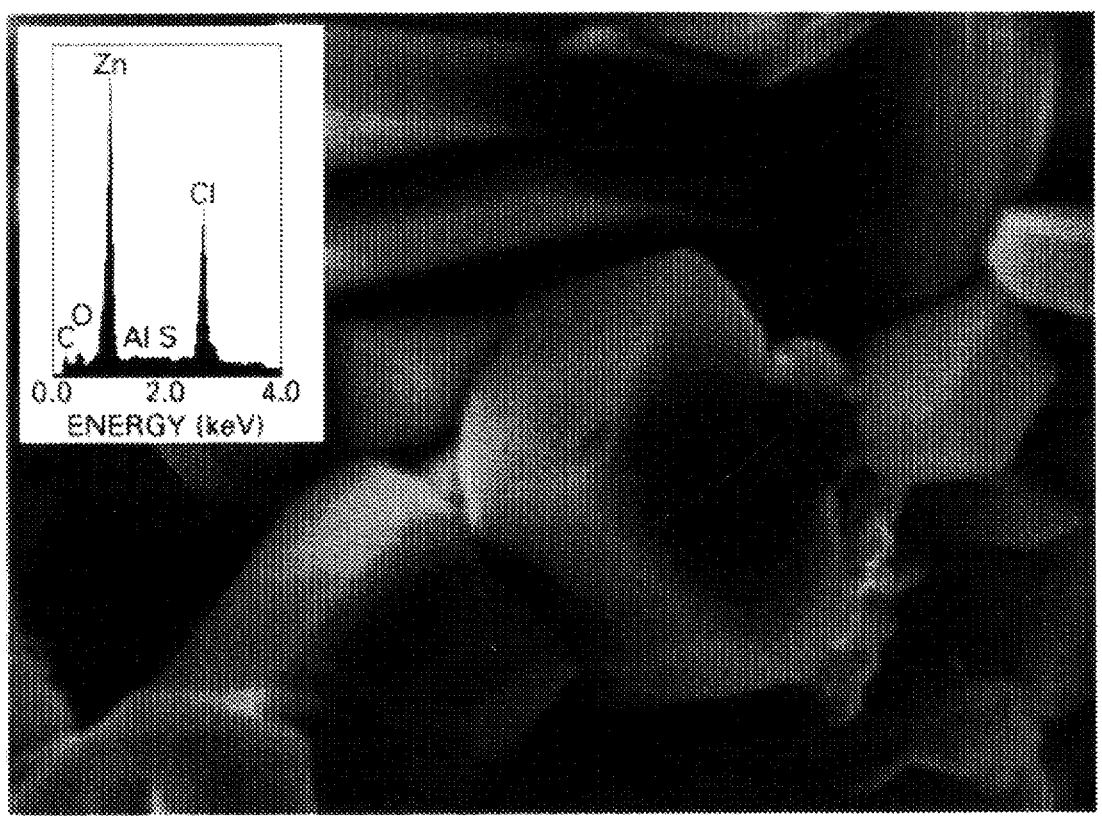
FIG. 1 is a scanning electron microscope photograph and the associated energy dispersive x-ray spectrum of INEL fly ash magnified 15,000 times, showing a typical size zinc chloride crystal.

In accordance with the present invention, a method for encapsulating and stabilizing radioactive, hazardous and mixed wastes in a modified sulfur cement composition is provided. The modified sulfur cement composition includes incinerator fly ash or bottom ash containing radioactive contaminants and toxic metal salts.

As used in the present invention radioactive waste refers to low level radioactive material as defined by Nuclear Regulatory Commission Regulations ("NRC") set forth in 10 CFR 61. Low level radioactive wastes do not include spent nuclear fuel, transuranic waste or byproduct materials which are defined as high-level radioactive wastes in § 11 e(2) of the Atomic Energy Act of 1954 at 42 U.S.C. 2014 (e).

Hazardous waste is understood to mean solid waste that may pose a substantial present or potential hazard to human health and the environment when improperly treated, stored, transported, disposed or otherwise managed as defined by § 1004 (5) of the Resource Conservation and Recovery Act as set forth at 40 CFR 261, EPA 55 Fed. Reg. 11862 (March 1990). Hazardous waste does not include low level radioactive waste.

Mixed waste as used herein refers to waste which includes low level radioactive waste, hazardous waste and sometimes other waste. A more complete definition of mixed waste is set forth in a Memorandum of Understanding between the NRC and EPA and as published at 51 Fed. Reg. 24505 (Jul. 3, 1986).

Prior to combining with modified sulfur cement the radioactive, hazardous and mixed wastes have been subjected to pretreatment steps in order to render all wastes substantially dry or anhydrous. The composition preferably includes glass fibers mixed into the composition to improve the mechanical and tensile strength of the resulting waste form. Other additives to improve mechanical strength such as carbon or steel fibers can also be used. The preferred composition also includes a low concentration of anhydrous anti-leaching agent such as sodium sulfide ($Na_2S$) to reduce toxic metal solubility, thereby reducing their leachability. Other additives including calcium or sodium hydroxide that also react with toxic metal salts to reduce their solubility can be used.

The method of the present invention for encapsulating the radioactive and hazardous mixed wastes preferably includes combining the substantially anhydrous ash contaminants, molten modified sulfur cement, preferably glass fibers, as well as anhydrous sodium sulfide in a heated doubleplanetary orbital mixer. The modified sulfur cement is preheated to about 135°±5° C., then the remaining components are added and mixed to homogeneity. The homogeneous molten mixture is poured or extruded into a suitable mold. The mold is allowed to cool, while the mixture hardens, thereby immobilizing and encapsulating the contaminants present in the ash.

In describing this invention molten modified sulfur cement will be understood to mean sulfur cement which has been heated to a temperature at which the cement can be mixed with additional components but which is not sufficient to induce polymerization, e.g., from about 90° C. to about 160° C., preferably 125° C. to about 155° C., and more preferably from about 130° C. to about 140° C.

Casting refers to forming the molten homogenous mixture of the present invention into a desired waste form shape for disposal and then cooling the waste form. Preferably the cooling is performed by permitting the temperature to be reduced to below its melting point in a manner which prevents cracking or shrinking.

An important aspect of the present invention is the ability to combine the primary components in amounts and under conditions which permit homogenous mixing. For example, the modified sulfur cement should be at a temperature which is sufficiently above the glass transition point to permit thorough envelopment of the substantially anhydrous component, but sufficiently below the polymerization temperature to prevent crystallization and cracking. For modified sulfur cement, the glass transition point is about 119° C. and the polymerization temperature is about 159.4° C.

It is preferable that the mixing steps are conducted under a partial vacuum, in order to vent entrapped air and residual moisture in the waste. The loading of incinerator fly ash can be up to 55 wt % of the composition and still maintain more than 4000 PSI compressive strength. A preferred composition of components is approximately 40% by weight incinerator fly ash, 52.5% by weight modified sulfur cement, 0.5% by weight of glass fibers and approximately 7% by weight anhydrous sodium sulfide. The quantity of glass fibers can vary from 0.1-10 wt % with the preferred range being 0.1-1.5 wt %. The most preferred composition, 0.5 wt %, provides suitable structural integrity without adversely affecting mixability.

Additions of sodium sulfide ranging between 1 and 20 wt % can be used, with the preferred range being 3-12 wt %. However, the optimal quantity of anhydrous sodium sulfide required depends on the concentration of toxic metals present in the ash. For incinerator ash containing no toxic metals, the preferred composition is 55 wt % anhydrous fly ash, 44.5 wt % modified sulfur cement and 0.5 wt % glass fibers. For incinerator ash containing high levels of toxic metals (e.g., 7.5 wt % lead and 0.2 wt % cadmium) the most preferred ratio of anhydrous sodium sulfide to anhydrous ash is 0.175, or about 7 wt % sodium sulfide. This ratio and anti-leaching composition can be adjusted by first determining the levels of soluble metals in the ash, and then performing titration experiments to reduce toxic metal leachability below regulatory requirements. Another preferred composition of components for non-mixed waste ash is approximately 43% by weight bottom ash, 56.5% by weight modified sulfur cement and 0.5% by weight glass fibers.

In another important aspect of the present invention the strength enhancing agent must be added in an amount which permits thorough mixing without "clumping." If the amount of strength enhancing agent is too small, the waste form will experience a structural deficiency and consequently, be damaged under normal transport and disposal conditions. If the amount of strength enhancing agent is too great, the mixture will become unworkable.

Monolithic waste forms containing as much as 55 wt % incinerator fly ash generated at Waste Experimental Reduction Facility (WERF) at the Idaho National Engineering Laboratory (INEL) have been formulated in accordance with the present invention, as compared to a maximum waste loading for this type of waste in hydraulic cement of 16 wt %. Compressive strength of the waste forms made in accordance with the present invention exceeded 27.6 MPa (4,000 psi). Wet chemical and solid phase waste characterization analysis performed in this fly ash revealed high concentration of soluble metal salts including Pb and Cd, identified by the EPA as toxic metals. Leach testing of the ash according to the EPA Toxicity Characteristic Leaching Procedure (TCLP) resulted in concentrations of Pb and Cd above allowable limits. Encapsulation of INEL fly ash (at waste loading up to 43 wt %) in modified sulfur cement with a small quantity of anhydrous sodium sulfide added to enhance retention of soluble metal salts, (and more preferably with glass fibers added) reduced TCLP leachate concentrations of Pb and Cd well below EPA concentration criteria defining toxic hazardous waste.

In addition, the present invention allows a maximum incinerator bottom ash loading of 43 wt %, with a waste form compressive strength of 30.5 MPa (4,430 psi). Biodegradation testing of the waste forms of the present invention resulted in no visible microbial growth of either bacteria or fungi. Initial radiation stability testing did not reveal statistically significant deterioration in structural integrity. Results of 90 day water immersion test were dependent on the type of ash tested. Waste forms containing a mixture of INEL fly ash and bottom ash from a rotary kiln incinerator at the Rocky Flats Plant (RFP) were not significantly affected by water immersion testing. Waste forms containing INEL incinerator fly ash with high concentration of soluble salts, without glass fibers, tended to swell and crack as a result of immersion testing. Accordingly, the present invention most preferably contains glass fibers to improve the mechanical integrity and eliminate waste form cracking under saturated conditions. Them were no statistically significant changes in compressive strength detected after completion of thermal cycle testing. Radionuclides from ash waste encapsulated in modified sulfur cement, in accordance with the present invention, leached between 5 and 8 orders of magnitude slower than leach index criterion established by the Nuclear Regulatory Commission (NRC) for low-level radioactive waste (LLW). Modified sulfur cement waste forms containing up to 43% by weight INEL incinerator fly ash passed EPA TCLP criteria for lead and cadmium leachability.

Figure 2:
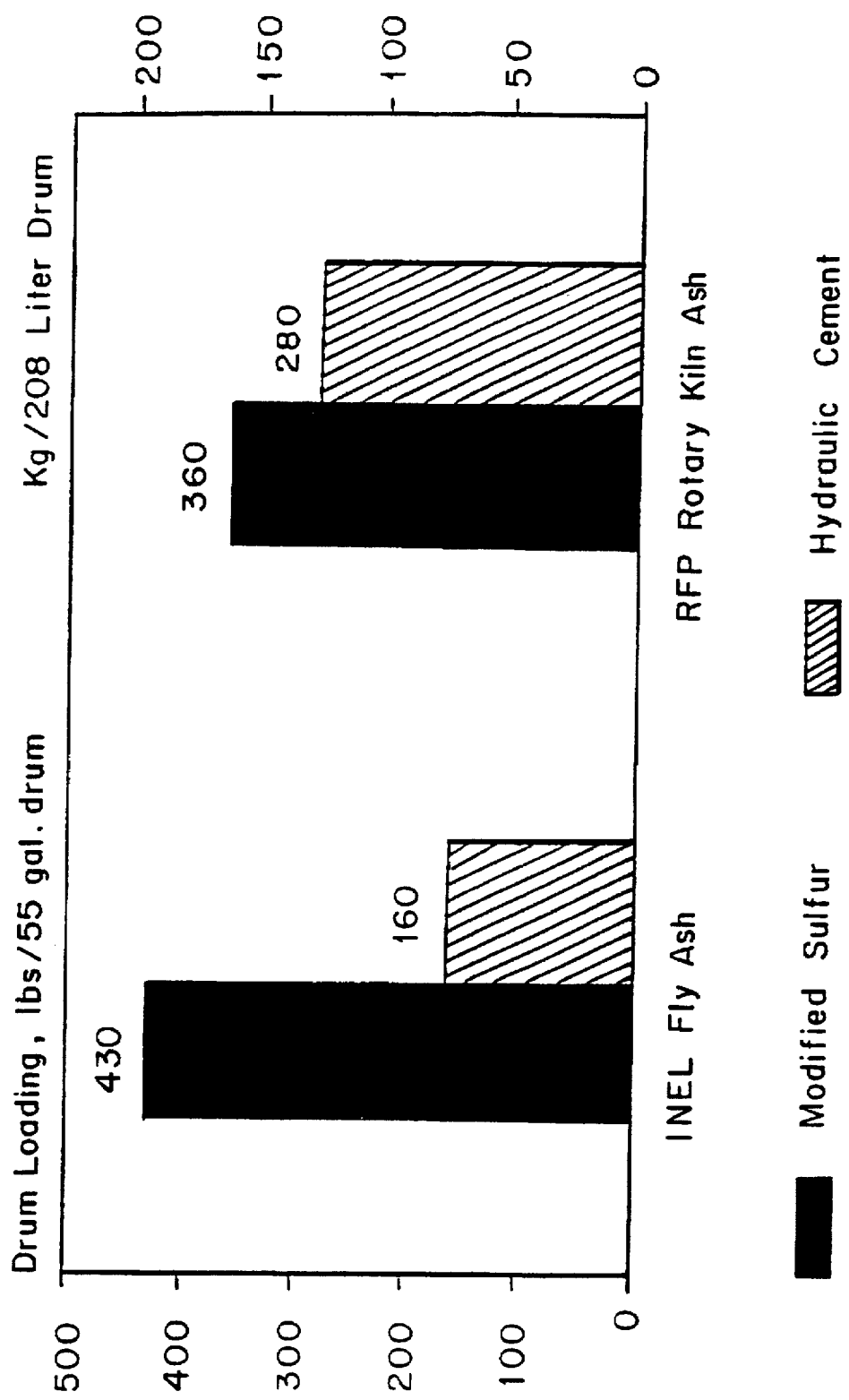
FIG. 2 is a graph comparing the maximum waste loadings per 55 gallon drum using modified sulfur cement vs. hydraulic cement to encapsulate RFP rotary kiln incinerator bottom ash and INEL fly ash.

The present invention does not require chemical reactions for solidification, in contrast to hydraulic cement processes, so that waste-binder interactions are minimized. The present invention allows a broader range of waste types to be encapsulated and results in better waste loading efficiencies (i.e., more waste per drum). Preferred formulations prepared in accordance with the present invention can contain as much as 43% by weight incinerator fly ash, while still maintaining leachability of toxic metals below allowable EPA criteria. Maximum loadings using conventional portland cement are limited to about 16% by weight ash. A comparison of maximum waste loading per 55 gallon drum using modified sulfur cement versus hydraulic cement to encapsulate RFP rotary kiln incinerator bottom ash and INEL fly ash is shown in FIG. 2.

Encapsulation of contaminants within a waste form is the first of several barriers used to isolate radioactive, hazardous and mixed wastes from the accessible environment. The durability of waste forms over long periods of time can therefore play an important role in ensuring continued isolation of contaminants. The approach used in testing the composition of the present invention was to provide reasonable assurance that waste forms will be structurally stable over time, involving application of short-term conditioning and property tests that reflect the anticipated conditions of disposal. This is the same approach used by the U.S. Nuclear Regulatory Commission (NRC) for the licensing of commercial LLW forms from nuclear power plants, as published in the "Technical Position on Waste Form", *Rev.* 0, Washington, D.C. (May 1983) in support of regulations contained in 10 CFR 61, (U.S. Code of Federal Regulations, Title 10, Energy, "Part 61—Licensing Requirements for Land Disposal of Radioactive Waste"), U.S. Government Printing Office (1990).

The focus of these examples was to test the encapsulated incinerator fly and bottom ash wastes made in accordance with the present invention, but the test data on modified sulfur cement binder and combinations with other wastes are also included, where applicable. Waste form performance testing included compressive strength, water immersion, thermal cycling, biodegradation, the effects of gamma irradiation, and leaching of radioactive constituents in accordance with NRC guidelines for licensing of radioactive waste forms. Leaching of hazardous constituents contained in the fly ash (i.e., toxic metals) was performed according to the Environmental Protection Agency (EPA) protocol contained in 40 CFR 261, "U.S. Environmental Protection Agency, Identification and Listing of Hazardous Waste", *Fed. Reg.*, 45:3319 (May 1980). These tests include the Extraction Procedure Toxicity Test (EP TOX), 40 CFR 261, Appendix II, "EP Toxicity Test Procedures", 45 FR 3319

(May 19, 1980), as amended by 48 FR 14293 (Apr. 1, 1983) and 50 FR 663 (Jan. 4, 1985); and the Toxicity Characteristic Leaching Procedure (TCLP) as defined in 40 CFR 261 Appendix II—"Toxicity Characteristic Leaching Procedure" (TCLP), 55 FR11863 (Mar. 29, 1990) were conducted on selected formulations to assess mobility of contained EPA characteristic contaminants.

EXAMPLES

Materials and Methods

1. Modified Sulfur Cement

The modified sulfur cement suitable for the present invention is manufactured by Martin Resources, Inc., Odessa, Tex. and is marketed under the tradename CHEMENT 2000.

2. Processing and Formulation Equipment

Since modified sulfur cement is a thermoplastic material, thermal input is required for processing. Because of its low viscosity in the molten state, modified sulfur cement flows readily but when mixed with dry waste materials it tends to form a thick paste. The primary requirements for processing, therefore, are suitable thermal input to supply latent heat of fusion and maintain a molten condition, and ability to thoroughly mix waste and binder under viscous conditions to form a homogeneous mixture. Additional considerations include: (i) the ability to operate under partial vacuum to vent entrained air and residual moisture that may be present in the substantially anhydrous waste, (ii) precise monitoring and control of process temperatures, and (iii) the ability to transfer waste-binder mixtures into sample molds for cooling. Several mixing systems were investigated for encapsulating hazardous ash mixtures in modified sulfur cement including high-shear stirrers, emulsifiers, blenders, kneaders, and single and double planetary orbital mixers.

Figure 3:
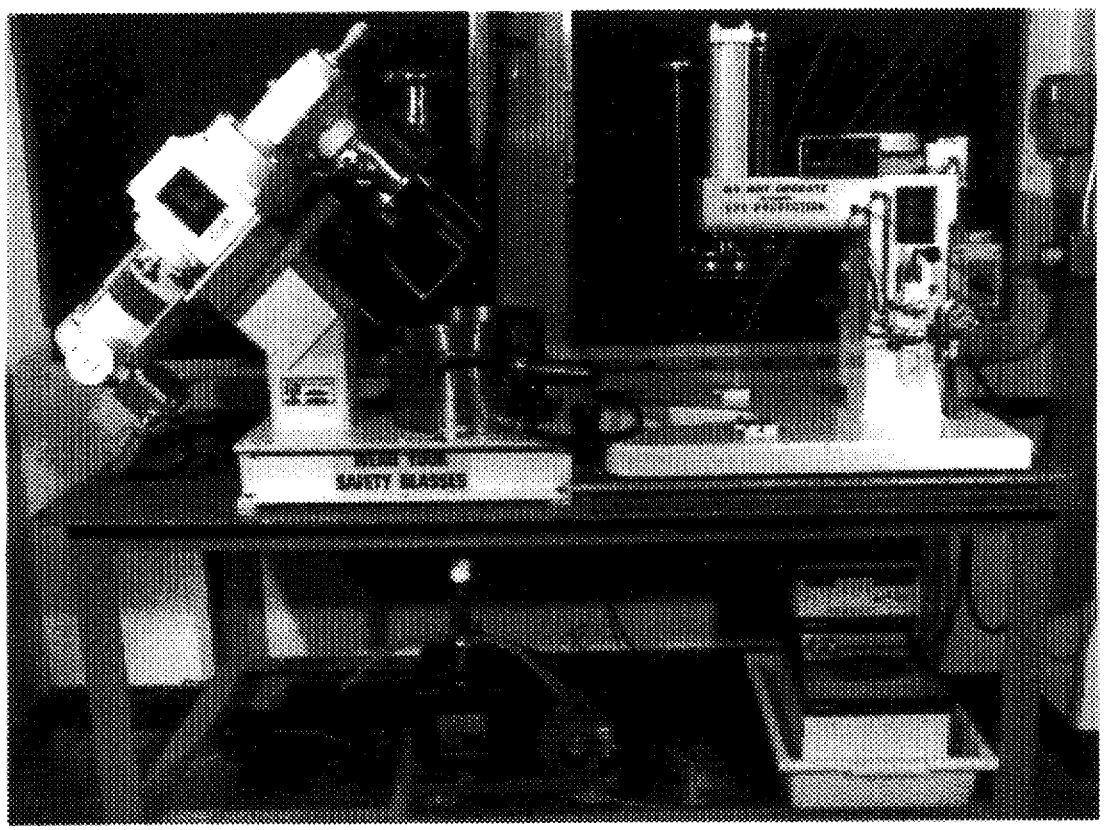
FIG. 3 is a photograph showing a laboratory-scale processing system used in the present invention including double planetary mixer and direct discharge system.

Several types of mixing devices capable of homogeneously mixing molten ingredients can be used. These include shear mixers, paddle mixers, pug mills, banbury mixers, kneaders, ribbon blenders and extruders. Based on the processing requirements of modified sulfur cement/waste combinations, a double planetary orbital mixer equipped with a heat-jacketed container and vacuum capability was chosen as the most appropriate method for mixing. The preferred mixer is designated as Model LDM-2, manufactured by Charles Ross & Son, Co., Hauppauge, N.Y. This type of mixer contains two rectangularly shaped stirrer blades that revolve around the mixing container on a central axis. At the same time, each blade revolves on its own axis at approximately the same speed as the central rotation. The combined effect of the dual rotational action results in the blades quickly covering the entire area within the mixing container, insuring complete homogeneity of the ingredients in several minutes. An auxiliary direct discharge system is used to extrude mixtures through a one (1) inch ball valve at the bottom of the container. The laboratory-scale processing system is shown in FIG. 3.

3. Temperature Control

The temperature control of the waste-binder mixture is a critical factor for processing modified sulfur cement waste forms in accordance with the present invention. During processing, temperature must be maintained above the melt point (119° C.) yet below the point at which additional polymerization occurs (159.4° C.), causing a sharp rise in viscosity as reported by Meyer, *Sulfur, Energy and Environment*, Elsevier Scientific Publishing Co., New York (1977). Although use of modified sulfur cement suppresses this polymerization, the presence of unreacted sulfur has caused several variations in viscosity at temperatures higher than 160° C. Accordingly, the suitable temperature range for processing modified sulfur cement is from 119° C. to 159.4° C. preferably 140°±15° C. and most preferably 135°±5° C.

4. Molds

For the purpose of testing for present invention, the waste-binder mixture was extruded or poured into molds and allowed to air cool. Initially, copper molds were employed, but difficulties were encountered in removing the specimens since the mixture tended to strongly adhere, especially when surface imperfections were present on the mold. The use of polyethylene molds fitted with external copper heat sink sleeves allowed for easy removal of waste form specimens.

5. Cooling of Waste Forms

Cooling times for the specimens were relatively rapid, (generally in the order of 15–30 minutes) due to the comparatively low specific heat capacity of the material (approximately 0.17 cal/g °C.). More rapid cooling induced by water bath or other means was avoided since quenching of sulfur results in additional allotropes which are uncharacteristically plastic in nature but revert back to the brittle phase in a short time, as reported by Meyer, supra (1977). Modified sulfur cement without addition of waste solids tended to form a hollow void along the cylinder's axial center line upon cooling. This phenomenon was due to the more rapid cooling of the exterior of the specimen by convection, forming a rigid shell. The solid exterior restricts movement of the molten center as it begins to solidify and shrink leaving a void in the center. Void formation decreased as the addition of waste solids increased, presumably due to higher specific heat capacity, reduced rate of cooling and reduced shrinkage.

6. Requirement for Homogeneity

A thorough homogenization of waste within the solidified waste form is an important quality assurance parameter since it provides:

1. Uniform distribution of radioactivity throughout the waste form—Avoidance of hot "spots" is an important consideration for the safe handling, storage and transportation of solidified LLW.
2. Uniform physicochemical properties—Substantial variations in waste concentration throughout the waste form can significantly alter such properties as leachability and compressive strength.
3. Accuracy and Waste Loading Determination—Since processing of modified sulfur cement is performed in batches yielding a number of separate waste forms, homogeneity must be assumed in determining the quantities of waste incorporated in each waste form.

7. Initial Waste Loading and Processing Development

Initial formulation and process development work was conducted to determine the limits and ease of processability, while at the same time producing waste forms that conform to regulatory criteria. Maximum waste loadings were determined by first pressing at waste loadings above the limits of workability (i.e., extremely dry mixtures that yielded friable products with little structural integrity), and then adding additional increments of modified sulfur cement until acceptable workability and product integrity were achieved. It was determined that the modified sulfur cement should first be premelted and then the waste should be added gradually to produce a homogeneous mixture. Reported waste loadings represent weight percent of dry ash, after all residual moisture has been removed. Using this procedure, maximum waste loading of 55 wt % INEL incinerator fly ash was determined. Due to its low pH and high chloride content, the maximum waste loading using portland cement achieved at INEL is only 16 wt %.

Example 1

Compressive Strength

Compressive strength is an overall indication of waste form structural integrity. Thus, it can be used to measure potential changes that may result from other test conditions, such as biodegradation, radiation stability, and thermal cycling. Also, compressive strength provides a general indication of the waste form's ability to withstand loading pressures associated with overburden soil at a disposal site. Compressive strength testing was conducted in accordance with ASTM C-39, "Compressive Strength of Cylindrical Concrete Specimens", C39-72, American Society for Testing and Materials, Philadelphia, Pa. (1975), since modified sulfur cement fails by brittle fracture under compressive loads. Average compressive strength data for plain modified sulfur cement and waste forms containing rotary kiln ash and incinerator fly ash are presented in Table 2.

TABLE 2

Representative Compressive Strength Data for Modified Sulfur Cement Waste Forms

| Sample | Compressive Strength, psi | Compressive Strength MPa |
|---|---|---|
| Modified Sulfur Cement (MSC)[a] | 2,460 ± 530 | 17.0 ± 3.7 |
| Rotary Kiln Ash: | | |
| 20 wt %[b] | 4,320 ± 300 | 29.8 ± 2.1 |
| 43 wt %[b] | 4,430 ± 260 | 30.5 ± 1.8 |
| Incinerator Fly Ash: 40 wt %[b] | 4,050 ± 650 | 27.9 ± 4.5 |
| 55 wt %[c] | 4,120 ± 330 | 28.4 ± 2.3 |

[a]Error expressed at the 95% confidence limit for 10 replicate samples.
[b]Error expressed as ± 1 standard deviation for 3 replicate samples.
[c]Error expressed as ± 1 standard deviation for 5 replicate samples.

Figure 4:
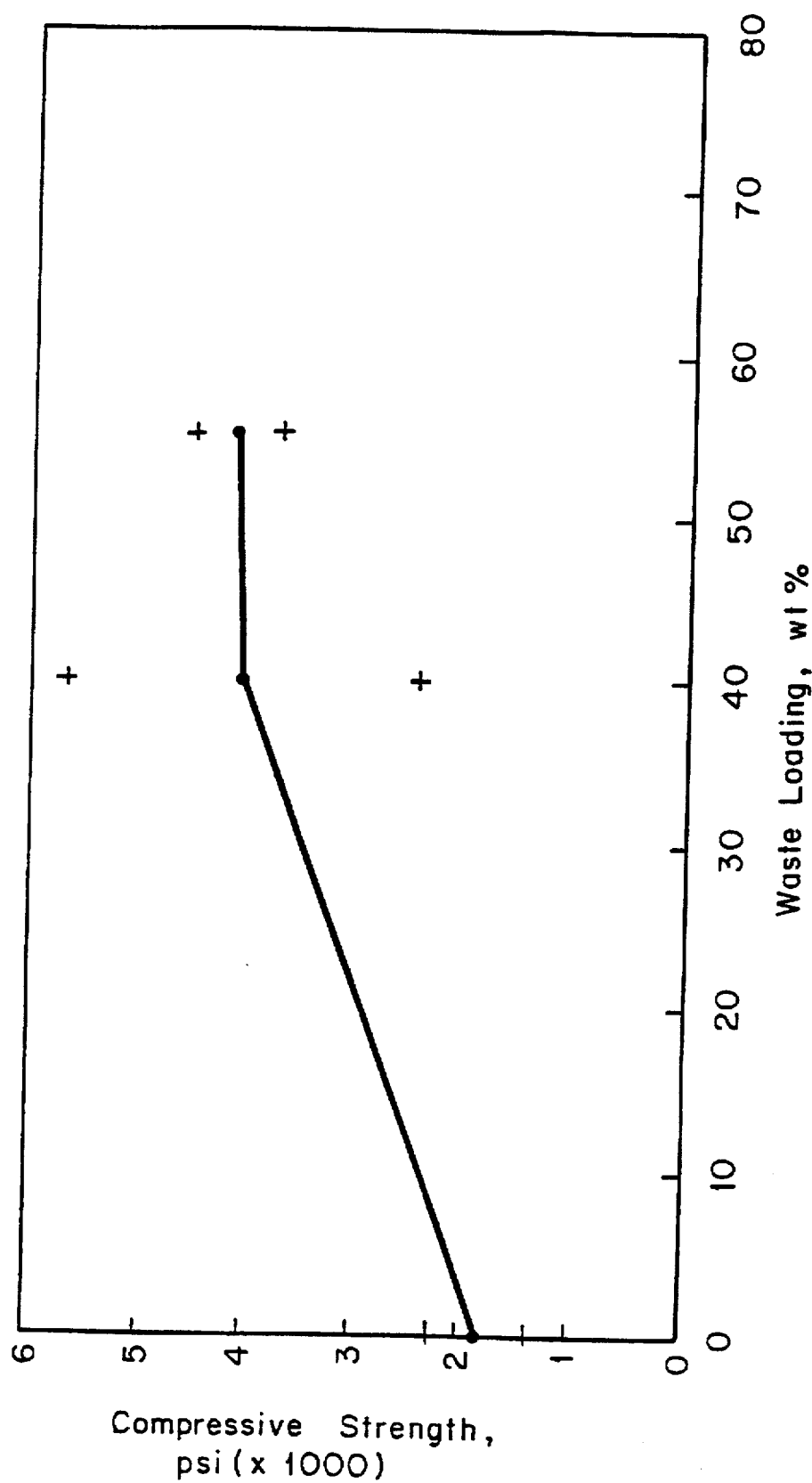
FIG. 4 is a graph showing compressive strength data for INEL incinerator fly ash encapsulated in modified sulfur cement. (Data shown are mean values for 3 replicates (5 for 55% samples); with error bars at 95% confidence interval).

In addition, the results from compressive strength testing of waste form specimens containing 40 and 55 wt % INEL fly ash encapsulating modified sulfur cement are presented graphically in FIG. 4 and are compared with compressive strength data for modified sulfur cement specimens containing no waste. Mean values for compressive strength were not highly dependent on waste loading-27.9 MPa (4,053 psi) for 40 wt % fly ash; 28.4 MPa (4,118 psi) for 55 wt % fly ash-but both waste loadings displayed more than two times greater strength than the modified sulfur cement alone-12.4 MPa (1800 psi).

Example 2

Leaching of Toxic Metals

Leaching of hazardous constituents (toxic metals) contained in the INEL incinerator fly ash was performed in accordance with EPA protocol specified for the TCLP test, which incorporates several modifications of the EP Tox test. One of the primary differences between the two procedures is that the TCLP does not allow testing of monolithic waste forms. Hazardous waste that is encapsulated in a solid matrix must be "prepared for extraction by crushing, cutting, or grinding the solid material" so that it "is capable of passing through a 9.5 mm (0.375 inch) standard sieve"; 40 CFR 261 Appendix II, TCLP, supra. In addition, TCLP requires a more vigorous method of agitation (end-over-end rotary tumbler) 40 CFR 261, Appendix II, supra.

INEL fly ash and samples of encapsulated fly ash at several waste loadings were tested using both the EP Tox and the TCLP. Both procedures specify maximum allowable concentrations of eight metals (As, Ba, Cd, Cr, Pb, Hg, Se, and Ag) and a number of organic compounds. Leachate analyses were performed by AA and the results tabulated in Table 3 show that Pb and Cd are present in TCLP leachates well above EPA allowable limits. These elements are also evident above allowable limits in TCLP leachates from waste encapsulated in plain modified sulfur cement, albeit at lower concentrations. Note that leachate concentrations for encapsulated waste samples tested by the EP Tox method are considerably lower, demonstrating the conservative nature of the TCLP test.

TABLE 3

Results from EPA Extraction Procedure Toxicity Test and Toxicity Characterization Leaching Procedure for INEL Ash Encapsulated in Modified Sulfur Cement

| Sample Tested | Concentrations of Criteria Metals, ppm[a,b] | |
|---|---|---|
| | Cd | Pb |
| INEL Fly Ash | 85.0 | 46.0 |
| 55 wt % Ash | 1.5 | 2.4 |
| 45 wt % MSC[c] (EP Tox) | (2.7) | (4.4) |
| 55 wt % Ash | 27.5 | 17.6 |
| 45 wt % MSC | (50.0) | (32.0) |
| 40 wt % Ash | 13.6 | 12.0 |
| 60 wt % MSC | (34.0) | (30.0) |
| 40 wt % Ash | 0.1 | 1.0 |
| 53 wt % MSC | (0.3) | (2.5) |
| 7 wt % Na$_2$S | | |
| 43 wt % Ash | 0.2 | 1.5 |
| 50 wt % MSC | (0.5) | (3.5) |
| 7 wt % Na$_2$S | | |
| EPA Allowable Limit | 1.0 | 5.0 |

[a]Data in parentheses represent concentrations normalized to account for reduced mass of fly ash in tested sample.
[b]Data represent TCLP results except where noted.
[c]MSC = modified sulfur cement.

Thus, in order to further reduce the mobility of toxic heavy metals in the fly ash and to comply with the EPA TCLP hazardous waste concentration limits, potential additives were examined, including precipitation agents, adsorption agents, and ion exchange resins. Based on the results of scoping experiments and other considerations (such as ease of processing, cost, availability) anhydrous sodium sulfide was selected as a preferred additive for use in the present invention. When placed in an aqueous medium sodium sulfide reacts with toxic metal salts to form metal sulfides of extremely low solubility. Sodium sulfide has been used extensively in waste water treatment, and as such, it has been identified by the EPA as a "Best Demonstrated Available Technology" (BDAT). In the present invention additives which chemically combine with toxic and other metals are immobilized in the new waste form to trap such toxic materials and prevent them from escaping to the environment. Since the formation of the new waste form from modified sulfur cement minimizes waste-binder interactions, the additive remains chemically available to react with toxic metals after it is immobilized in the waste matrix. Consequently, the additive, i.e., the anti-leaching agent is both: (i) immobilized in the east waste form, and (ii)

available to react with toxic and other metals. As long as no moisture permeates the waste form, the anti-leaching additives and available metals in the waste form remain unreacted. When moisture permeates the waste form, the toxic and other metals in the waste form contact available immobilized and unreacted additives to the extent necessary to form precipitates. Thus, when the metals contact the immobilized and untreated anhydrous anti-leaching additives as a result of moisture seeping into the waste form, the toxic and other metals are prevented from leaching by reacting with the additives in the aqueous medium provided by the seeping moisture.

Figure 5:
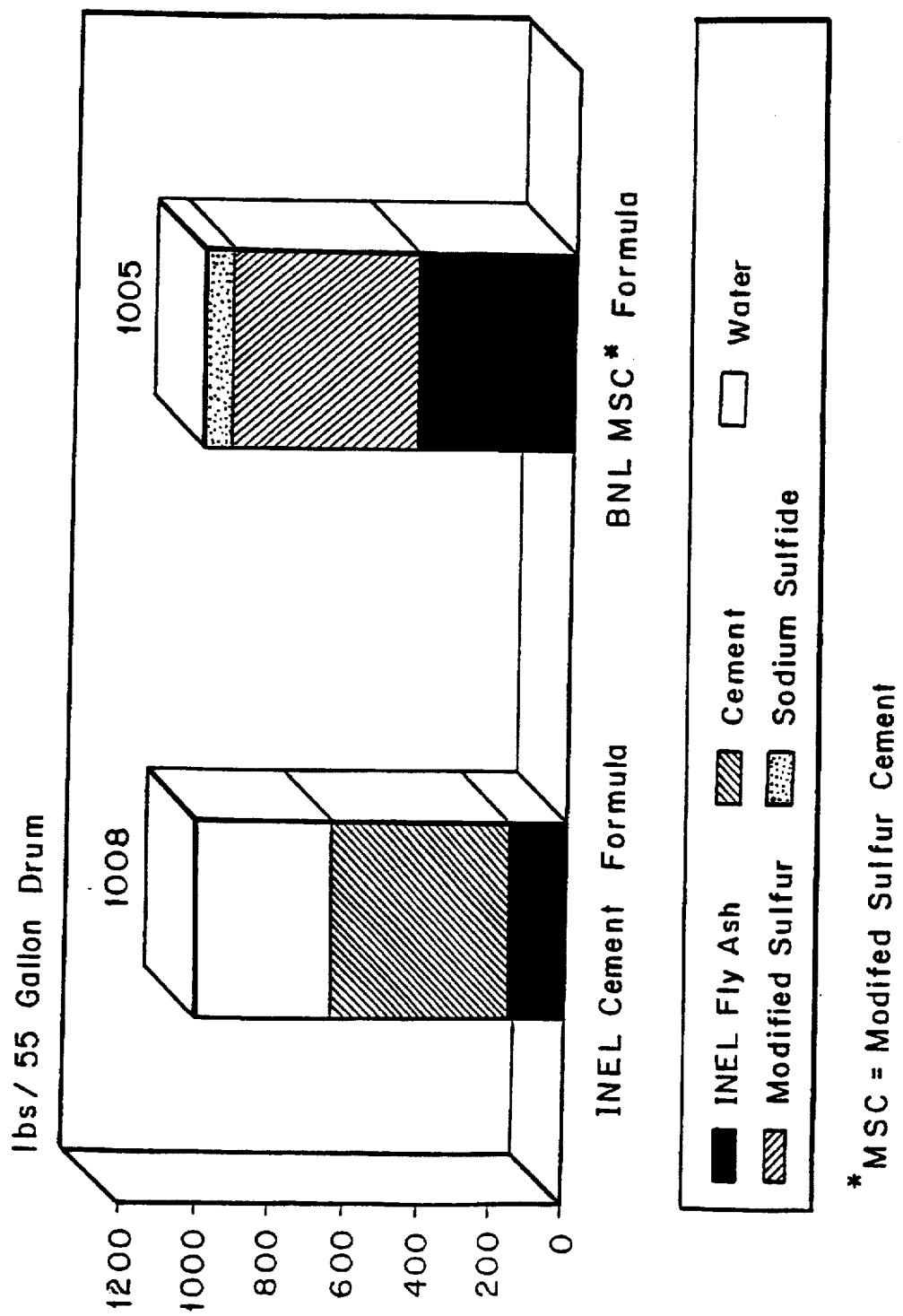
FIG. 5 is a graph comparing waste loadings for encapsulation of INEL incinerator fly ash in modified sulfur cement and portland cement.

A preferred ratio of sodium sulfide/fly ash of 0.175 was the preferred ratio used based on the results of an experiment to determine the effectiveness of this additive on Cd mobility under EPA leaching conditions. As shown in Table 3, TCLP leachates from waste forms containing 40 wt % fly ash, 53 wt % modified sulfur cement, and 7 wt % sodium sulfide were well within allowable concentration limits for Cd and Pb. Optimization of INEL incinerator fly ash waste loading with added sodium sulfide ($Na_2S$), while maintaining additives/ash ratio constant, yielded a maximum waste loading of 43 wt % fly ash, 49.5 wt % modified sulfur cement, and 7.5 wt % sodium sulfide. As seen in FIG. 5, this ratio represents about 2.7 times more incinerator fly ash per 55 gallon drum than is currently possible using portland cement, while still meeting EPA criteria for delisting as a hazardous waste.

A comparison of the leachability results obtained by using the method of the present invention and the leachability of cadmium and lead according to a treatment disclosed in U.S. Pat. No. 4,629,509 to O'Hara et al. indicates that the process of the present invention is far superior and more economical. For example, the average of four test runs set forth in Table 2 of O'Hara, et al., yields a lead concentration of 4.83 ppm and a cadmium concentration of 3.01 ppm. A reduction factor $R_f$ resulting by dividing the metal concentration before treatment with the metal concentration following treatment yields $R_f=8.7$ for lead and $R_f=6.0$ for cadmium according to O'Hara, et al.

In contrast, based on the information set forth in Table 3 on page 31 herein, an $R_f=18.4$ for lead and $R_f=283$ for cadmium are obtained for a mixture of 40% ash, 53% modified sulfur cement and 7% sodium sulfide. These calculations are based on the data set forth in parenthesis of Table 3 wherein the data has been normalized to account for a reduced quantity of waste as found in the waste forms of the present invention.

A direct comparison of the above $R_f$ Values indicates that by using the process of the present invention the leaching factor is reduced by 2 for lead and by 47 for cadmium.

It is also important to note that the leaching criteria disclosed in O'Hara, et al. are based on 40 C.F.R. 61, namely EPA's extraction procedure toxicity test known as the EP Tox Test later superseded by the Toxicity Characteristic Leaching Procedure known as TCLP. Both of these tests are short term tests based on an 18 hour leaching period. By contrast, because the present invention provides a method for treatment of commercial radioactive waste, the treated waste of the present invention is tested according to stabilization criteria established by the Nuclear Regulatory Commission (NRC), as set forth in NRC Branch Technical Position 10 C.F.R. 61. The leaching test used by NRC is a 90 day leaching test called ANS 16.1. O'Hara, et al. do not meet the much stricter criteria imposed by NRC. By treating wastes in accordance with the present invention, the reduction of leaching is much better than the prior art as measured by considerably stricter testing.

Example 3

Resistance to Microbial Degradation

Modified sulfur cement specimens containing no waste were tested for resistance to microbial degradation in accordance with ASTM G-21, "Determining Resistance of Synthetic Polymeric Material to Fungi", and ASTM G-22, "Determining Resistance of Plastics to Bacteria". These tests were designed for use with polymers, but have been adopted by the NRC as generic tests for microbial degradation of waste forms. These tests were conducted under conservative test conditions, i.e., specimens are exposed to active biological cultures under ideal growth conditions including:

(a) incubation at 35°–37° C.

(b) moist atmosphere, relative humidity of $\geq 85\%$, and (c) presence of a nutrient agar to sustain growth.

The specimens are examined for evidence of microbial growth following 21 days of incubation. Results for ASTM G-21 are reported on a scale of 0 (no observed growth) to 4 (heavy growth, $\geq 60\%$ of surface covered). Results for ASTM G-22, are expressed simply as growth/no growth. If growth is observed, it is an indication that the microbes were able to metabolize carbon contained in the test specimen. Modified sulfur cement contains approximately 5 wt % carbon. Additional biodegradation testing is being conducted using several thiobacillus strains that have the potential for metabolizing sulfur materials, see Meyer, *Sulfur, Energy, and Environment*, Elsevier Scientific Publishing Co., New York (1977).

Six replicate specimens were tested for each procedure. All samples exposed to the fungi (ASTM G-21) were given a growth rating of 0. All samples exposed to the bacteria (ASTM G-22) exhibited no growth. Biodegradation specimens were then tested for compressive strength and results are present in Table 4. Average compressive strength was 18.1±5.1 MPa (2,620±740 psi), compared with untreated modified sulfur cement control samples, which had an average compressive strength of 17.0±3.7 MPa (2,460±530 psi). Thus, there were no statistically significant changes in strength observed as a result of biodegradation testing.

TABLE 4

Compressive Strength or Modified Sulfur Cement Waste Forms Following Biodegradation and Radiation Stability Testing[a]

| | Modified Sulfur Cement | Modified Sulfur Cement with 39% Sludge |
|---|---|---|
| Biodegreadtion: | | |
| Compressive Strength psi | 2,620 ± 740[b] | 2,960 ± 1,040[d] |
| Compressive Strength, MPa | 18.1 ± 5.1 | 20.4 ± 7.2 |
| Radiation Stability: | | |
| Compressive Strength, psi | 1,950 ± 940[c] | 3,150 ± 1,000[e] |
| Compressive Strength, MPa | 13.4 ± 6.5 | 21.7 ± 6.9 |

[a] Error expressed at 95% confidence limit.
[b] Eleven replicate samples tested.
[c] Nine replicate samples tested.
[d] Eleven replicate samples tested.
[e] Five replicate samples tested.

Example 4

Compressive Strength Testing Following Gamma Irradiation

The effects of gamma irradiation on radioactive and mixed waste forms can have an important influence on long-term durability. Absorbed radiation dose is a cumulative phenomenon. Therefore, significant doses can be accumulated over time, depending on the activity level contained within the waste form and the radiation field from other waste forms in the immediate disposal environment. In this example, waste form specimens were expose to total doses of $\geq 10^6$ Grays ($10^8$ rads) at the BNL $^{60}$Cobalt Gamma Irradiation Facility to examine potential effects of gamma irradiation. Irradiation test specimens included modified sulfur cement containing no waste and modified sulfur cement waste forms containing 39 dry wt % sludge from the Oak Ridge National Laboratory Y-12 facility in Oak Ridge, Tenn. Dose rates range between $1.2\times10^4$ and $2.6\times10^4$ Grays/hr ($1.2\times10^6$ and $2.6\times10^6$ rads/hr), depending on the location of the particular gamma sources. Exposure estimates are based on time within the facility and do not account for self-shielding effects of the material, which are expected to be relatively insignificant.

The arbitrary absorbed dose limit of $10^6$ Grays ($10^8$ rads) is conservative and represents an upper bound of anticipated dose for LLW waste forms generated at commercial power reactors. For example, one study estimates that waste forms from boiling water reactors (BWRs) containing as much as $1.1\times10^{11}$ Bq/m$^3$ (10 Ci/ft$^3$) would experience a total dose of about $2\times10^5$ Grays ($2\times10^7$ rads) during 1000 years in disposal. Waste forms generated at pressurized water reactors (PWRs) with a similar activity content but different radionuclide ratios would receive about $9\times10^5$ Grays ($9\times10^7$ rads) over a period of 1000 years, as reported by Neilson and Colombo, "Properties of Radioactive Wastes and Waste Containers, First Topical Report", *BNL-NUREG-50957*, Brookhaven National Laboratory, Upton, N.Y. (January 1979). INEL incinerator ash has a relatively low specific activity (about 260 Bq/g or $7.0\times10^{-9}$ Ci/g). A modified sulfur cement waste form containing 43 wt % INEL incinerator fly ash would have an activity concentration of about $2.1\times10^5$ Bq/m$^3$ ($2.0\times10^{-4}$ Ci/ft$^3$), or roughly 5 orders of magnitude lower than the conservative estimates for commercial reactor waste forms cited above.

In this example, specimens were tested for compressive strength following removal from the irradiation source. Results are given in Table 4, above. The average compressive strength for 9 replicate modified sulfur cement samples irradiated to $10^6$ Grays ($10^8$ rads) was 13.4±6.5 MPa (1,950±940 psi), compared with the untreated control samples (17.0±3.7 MPa or 2,460±530 psi). While there was a reduction in average compressive strength of about 20%, the large degree of scatter in these data make it difficult to attribute loss of strength to the effects of irradiation. Mean compressive strength for the 6 replicate waste forms containing sludge irradiated to $10^6$ Grays ($10^8$ rads) was 21.7±6.9 MPa (3,150±1000 psi). There was no statistically significant change in strength for these samples detected, compared with compressive strength data for similar samples that were not irradiated (20.4±7.2 MPa or 2,960±1,040 psi). Confirmatory testing by means of differential scanning calorimetry (DSC) on irradiated modified sulfur cement is currently being performed to determine if changes in material structure can be detected after irradiation. Additional testing of irradiated modified sulfur cement waste forms containing incinerator fly ash is also being performed.

Example 5

Water Immersion Testing

Water immersion testing was performed to simulate conditions in a saturated disposal environment. It has been shown that catastrophic failures of the structural integrity of waste forms can occur upon immersion in water for some types of wastes, see for example Neilson, Kalb, Fuhrmann and Colombo, "Solidification of Ion Exchange Resin Waste in Hydraulic Cement", *The Treatment and Handling of Radioactive Wastes*, Blasewitz et al. (eds.), Springer-Verlag, N.Y. (1983). Previous water immersion testing of modified sulfur cement waste forms containing RFP incinerator bottom ash from a rotary kiln incinerator resulted in no significant changes in dimensions or compressive strength. This test was repeated for waste forms containing INEL incinerator fly ash because of the extremely high concentrations of soluble metal salts, for instance see Table 1 which lists the elemental composition INEL incinerator fly ash as containing 36 wt % zinc, 7.5 wt % lead, 5.5 wt % sodium, 2.8 wt % potassium, as well as lower concentrations (below 1 wt %) of other metals. When the soluble metal salts (primarily in the chloride form) come in contact with water, high expansive forces can result causing cracking of the waste form. The results of a 90 day water immersion test for modified sulfur cement containing 40, 35, and 30, wt % INEL incinerator fly ash are shown in the photographs in FIG. 6A, 6B and 6C. As shown, each of these waste forms experienced cracking as a result of water immersion. The severity of the cracking is directly related to the waste loading of the INEL incinerator fly ash.

Several approaches were attempted to alleviate cracking failures of INEL incinerator ash waste forms due to water immersion. Additional additives were tried to reduce the solubility of the non-toxic soluble metal chloride salts, primarily zinc chloride, and, thereby, reduce cracking of the waste forms by swelling. A scoping experiment was devised using Ca(OH)$_2$ and MgO as potential additives. Ca(OH)$_2$ was added to the formulation at additive/ash ratios of 0.08, 0.15, and 0.22. MgO was added at ratios of 0.06 and 0.08. The additives were mixed with INEL incinerator fly ash, the mixtures were leached in water and the leachates were analyzed for Zn, Ca, and Mg.

TABLE 5

Leaching Results to Determine Effectiveness of Additives in Reducing Metal Salt Solubility for INEL Fly Ash

| Additive | Additive/Ash Ratio, g/g | Leachate Concentrations, mg/l | | |
|---|---|---|---|---|
| | | Zn | Ca | Mg |
| None (plain ash) | 0 | 6,050 | 159 | 6.2 |
| Ca(OH)$_2$ | 0.08 | 770 | 1,690 | 34 |
| Ca(OH)$_2$ | 0.15 | 0.1 | 2,850 | 13 |
| Ca(OH)$_2$ | 0.22 | 0.4 | 3,030 | 18 |
| MgO | 0.06 | 810 | 111 | 153 |
| MgO | 0.08 | 260 | 108 | 129 |

Concentration of zinc in the leachate without additives was high (6050 mg/l), as shown in Table 5. The addition of calcium hydroxide Ca(OH)$_2$ was able to reduce Zn solubility (0.1 mg/l at 0.15 additive/ash ratio), but at the expense of introducing soluble Ca (2850 mg/l). The MgO was less effective in reducing Zn concentrations (lowering it to 260 mg/l at an additive/ash ratio of 0.08), however, the total concentrations of Zn, Ca, and Mg combined was about 12 times less than with no additives and about 6 times less than when Ca(OH)$_2$ was added. Waste forms containing 38 wt % fly ash, 53 wt % modified sulfur cement, 6 wt % Na$_2$S, and 3 wt % MgO were formulated based on these results, as well as the results of Example 2, above. These waste forms, however, also cracked when subjected to the same type of water immersion testing.

Example 6

The Addition of Glass Fibers to Improve Structural Integrity

Figure 6A:
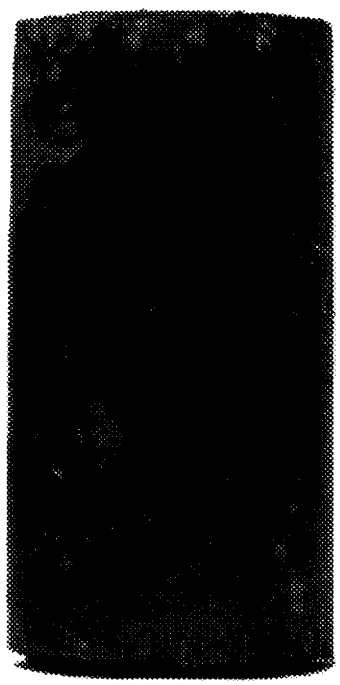
FIG. 6A=30 wt % fly ash.
Figure 6B:
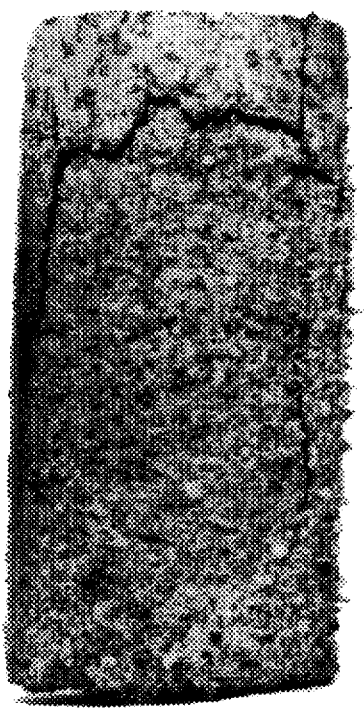
FIG. 6B=35 wt % fly ash.
Figure 6C:
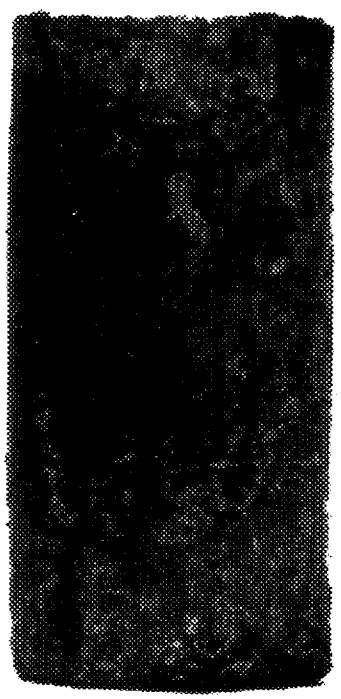
FIG. 6C=40 wt % fly ash.
Figure 6D:
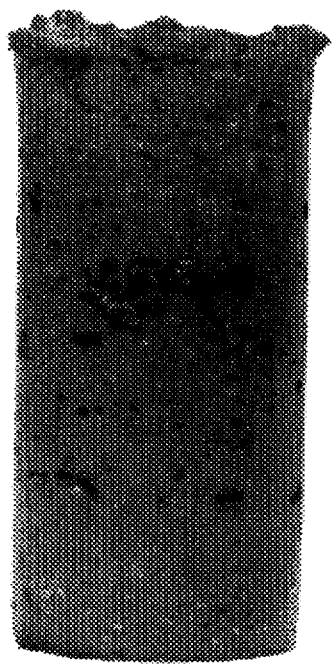
FIG. 6D=40 wt % ash with addition of 0.5 wt % glass fibers. Precipitation of insoluble metal salts seen in upper fight photo was removed from other samples to examine surface for cracking.

Another approach was aimed at improving the ability of waste forms to withstand expansive forces. This approach utilizes the addition of glass fibers to increase the tensile strength of the waste form. The use of glass fibers to improve the structural integrity of sulfur polymer concrete in the construction industry was reported by Jong et al., "Fiber Reinforcement of Concrete to Enhance Flexural Properties", *RI*-8956, Bureau of Mines, Department of Interior, Washington, D.C. (1985). A small quantity, (0.5 wt %) of glass fibers, manufactured by Owens Corning, Corning, N.Y., 0.5" in length was added to the preferred mixture for making incinerator fly ash waste forms. Larger quantities tended to clump and make the mixture unworkable. Waste forms containing a most preferred composition of 40 wt % ash, 52.5 wt % modified sulfur cement, 7 wt % Na$_2$S, and 0.5 wt % glass fibers were formulated and subjected to water immersion testing. The addition of 0.5 wt % glass fibers provided sufficient tensile and strength to maintain the structural integrity during the 90 day water immersion test, as shown in FIG. 6D. The modified sulfur waste form specimens shown in FIGS. 6A, 6B and 6C showed severe cracking following 90 day water immersion test. The precipitation of insoluble metal salts that can be seen in the upper right photo was removed from the other samples to examine their surfaces for cracking. As can be seen the three samples which did not contain glass fibers all exhibit significant cracking while the example on the lower right containing 40 wt % ash with the addition of 0.5 wt % glass fibers did not exhibit any significant cracking.

Example 7

Effect of Changes in Temperature on Modified Sulfur Cement Waste Forms

Waste forms may be subjected to severe changes in temperatures during storage and transport. Thermal cycling of waste forms was conducted to determine if such changes in temperature lead to degradation of structural integrity. Thermal cycle conditioning was performed in accordance with the procedures outlined in ASTM B-553, "Thermal Cycling of Electroplated Plastics", with modifications suggested by the NRC, as discussed in the U.S. Nuclear Regulatory Commission, "Technical Position on Waste Form", *Rev.* 0, Washington, D.C. (May 1983). Temperatures were cycled between minus 40 and plus 60° C. over a five hour period for a total of 30 cycles. Potential changes in material properties were measured by changes in compressive strength. Test samples included 20 wt % and 43 wt % rotary kiln ash encapsulated in modified sulfur cement. The results of this test are presented in Table 6 and indicate that no significant changes in compressive strength were detected as a result of thermal cycling.

TABLE 6

Effects of Thermal Cycling on Compressive Strength of Rotary Kiln Ash Encapsulated in Modified Sulfur Cement[a]

| Waste Loading | Compressive Strength, psi | Compressive Strength, MPa |
| --- | --- | --- |
| 20 wt % | 4,370 ± 930 | 30.1 ± 6.4 |
| 43 wt % | 4,340 ± 2,870 | 29.9 ± 19.8 |

[a]Results reflect mean values for 3 replicate specimens. Error represents ± 1 standard deviation.

Example 8

Leaching of Radioactive Constituents

Leaching is a primary mechanism for dispersal of contaminants under humid disposal conditions. Although laboratory leaching conditions do not reflect those found in actual disposal sites, standardized leaching tests can provide useful information on the leaching behavior of waste forms.

Leaching of radioactive constituents was performed for 90 days using distilled water leachant, in accordance with ANS 16.1 Standard, "Measurement of the Leachability of Solidified Low-Level Radioactive Wastes." Modified sulfur cement waste forms containing 20 and 40 wt % rotary kiln ash treated with a tracer solution of $^{137}$Cs and $^{60}$Co were leached, as described by Kalb and Colombo, "Modified Sulfur Cement of Low-Level Wastes, Topical Report", *BNL*-51923, Brookhaven National Laboratory, Upton, N.Y., at pp. 49–56 (October 1985), as follows:

Simulated radioactive waste forms were prepared in duplicate samples containing 20 and 40 wt % rotary kiln incinerator ash. $^{137}$Cs and $^{60}$Co tracers were added at a nominally constant ratio of 0.25 µCi per gram of waste. Activity concentrations found in actual low-level waste may vary over several orders of magnitude. Therefore, activity concentrations for this experiment were selected which were both reasonable from the standpoint of simulating actual waste and practical from the standpoint of experimental considerations, e.g., detection limits and radiation dose levels. Actual activity contained in the samples ranged from approximately 17 to 48 µCi of each isotope per waste form, depending upon waste loading.

In order to evenly distribute the aqueous tracer activity throughout the dry incinerator ash waste, the following procedure was employed. A quantity of rotary kiln bottom ash was weighed and thoroughly mixed to a slurry. The appropriate volume of tracers were pipeted into the slurry of ash in distilled water which was then thoroughly mixed. The mixed slurry was evaporated to dryness and the ash which remained was crushed to a fine powder by mortar and pestle.

Since waste-binder mixture were not prohibitively viscous, modified sulfur cement leaching specimens were prepared in disposable glass beakers, wrapped with electrical resistance heaters and insulation. This procedure enabled the use of a new mixing container for each batch and eliminated concerns over cross-contamination. Heating was adjusted by variable voltage controller and mixing was accomplished using an electrically driven impeller. Modified sulfur cement was pre-heated to a molten state. Waste was then added and stirred for 10–20 minutes. The mixtures were then poured into polyethylene lined sample molds and allowed to cool. Apparent voids were refilled as necessary. Upon cooling, waste form heights were trimmed and the surfaces of the cut ends were resealed by using a heat gun.

Waste form dimensions were recorded for calculation of volumes and surface areas. Weights were taken so that waste form activity source terms could be calculated based upon the waste loading (wt %) and final weight of each specimen.

The specimens were leached in demineralized water. The volume of leachant employed ranged between 1470 and 1720 ml as specified by the ratio of leachant volume to external geometric surface area of 10±0.2 cm. Temperature was maintained at 20°±2° C. Leachant was replenished at the recommended incremental intervals of 30 seconds, 2 hours, 5 hours, 17 hours, once each day for the next four days, 13, 28 and 45 days, for a total leaching time of 91 days.

Leachate aliquots of 100 ml were collected for analysis, acidified with 1 ml of nitric acid and were then prepared for gamma counting. Leachate analysis were performed using a germanium detector and computerized multichannel analyzer system. Data reduction was accomplished by use of several programs written for a Hewlett Packard HP-85 micro computer, which calculated incremental and cumulative fraction release, stored and printed tabular data and plotted leaching curves.

Average cumulative $^{137}Cs$ fraction release was determined as a function of leaching time (in days) for incinerator ash waste forms. Also, average cumulative $^{60}Co$ fraction release was determined as a function of leaching time for the incinerator ash specimens. Leaching results presented in Table 7 in terms of leachability index, a figure of merit inversely proportional to the logarithm of the effective diffusivity constant. Leachability index values between 11.1 and 14.6 represent improvements over the minimum NRC leachability index criteria of 6.0 by more than 5 and 8 orders of magnitude, respectively.

TABLE 7

Average Leachability Index Values for Modified Sulfur Cement Waste Forms Containing Rotary Kiln Incinerator Ash[a,b]

| Waste Loading wt % | $^{60}Co$ Leachability Index | $^{137}Cs$ Leachability Index |
|---|---|---|
| 20 | 14.0 | 11.2 |
| 40 | 14.6 | 11.1 |

[a]As per procedures outlined in ANS 16.1 Standard Leach Test Method.
[b]Average of two replicate samples.

As shown in Table 7, $^{137}Cs$ and $^{60}Co$ leachability for modified sulfur cement waste forms containing incinerator ash do not appear to be dependent upon waste loading. On a plant scale, the leachability index can be employed as a means of demonstrating that waste forms meet minimum quality assurance standards. As a result, in 1983 the NRC issued recommended minimum leachability index specifications in support of 10 CFR 61 waste form stability requirements in USNRC, "Technical Position on Waste Form", U.S. Nuclear Regulatory Commission, Low-Level Waste Licensing Branch, Washington, D.C. (May 1983).

Thus, while we have described what are presently the preferred embodiments of the present invention, other and further changes and modifications could be made thereto without departing from the scope of the invention, and it is intended by the inventors herein to claim all such changes and modifications.

We claim:

1. A process for encapsulating radioactive, hazardous and mixed wastes and simultaneously preventing leaching therefrom, comprising:

combining anhydrous radioactive, hazardous and mixed waste with (i) molten modified sulfur cement, (ii) an anhydrous anti-leaching agent, and (iii) a strength enhancing agent as a substantially homogeneous mixture, and casting said mixture as a selected monolithic waste form.

2. The process of claim 1, wherein said radioactive, hazardous and mixed waste is contaminated incinerator ash.

3. The process of claim 1, wherein said strength enhancing agent is selected from the group consisting of carbon fibers, steel fibers, glass fibers and mixtures thereof, thereby increasing the tensile strength of said monolithic waste form.

4. The process of claim 1, wherein said dry anti-leaching agent is selected from the group consisting of calcium hydroxide, sodium hydroxide, sodium sulfide, calcium oxide, magnesium oxide and mixtures thereof.

5. The process of claim 1, wherein, said dry anti-leaching agent is sodium sulfide.

6. The process of claim 1, wherein said dry anti-leaching agent is present in an amount from about 1.0 wt % to about 20.0 wt % and said strength enhancing agent is present from about 0.1 wt % to about 10.0 wt %.

7. The process of claim 6, wherein said dry anti-leaching agent is present in an amount ranging from about 3.0 wt % to about 12.0 wt % and said strength enhancing agent is present in an amount from about 0.1 wt % to about 1.5 wt %.

8. The process of claim 7, wherein said anti-leaching agent is present in an amount of 7 wt % and said strength enhancing agent is present in an amount of 0.5 wt %.

9. The process of claim 1, wherein said combining is conducted under a partial vacuum.

10. The process of claim 1, wherein said radioactive, hazardous and mixed wastes are added in amount which is greater than 16 wt % and up to about 55 wt %.

11. The process of claim 10, wherein said waste form has a compression strength greater than 4000 psi.

12. The process of claim 1, wherein said casting comprises cooling at a rate which prevents quenching of said modified sulfur cement in a manner resulting in production of allotropes which revert to a brittle phase after cooling.

13. The process of claim 1, wherein said modified sulfur cement has been preheated in a range from about 119° C. to about 159° C.

14. The process of claim 13, wherein said modified sulfur cement has been preheated in a range from about 130° C. to about 150° C.

* * * * *